(12) United States Patent
Singh et al.

(10) Patent No.: US 8,889,037 B2
(45) Date of Patent: Nov. 18, 2014

(54) SYSTEMS AND METHODS FOR PRODUCING SYNGAS AND PRODUCTS THEREFROM

(75) Inventors: Shashi Singh, Missouri City, TX (US); Keith King, Cypress, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 962 days.

(21) Appl. No.: 13/019,027

(22) Filed: Feb. 1, 2011

(65) Prior Publication Data

US 2012/0195817 A1  Aug. 2, 2012

(51) Int. Cl.
*B01J 8/36* (2006.01)
*C10J 3/48* (2006.01)
*C01B 3/02* (2006.01)
*C01B 3/38* (2006.01)
*C01B 3/48* (2006.01)

(52) U.S. Cl.
CPC .................. *C01B 3/025* (2013.01); *C01B 3/382* (2013.01); *C01B 3/384* (2013.01); *C01B 3/48* (2013.01); *C01B 2203/0233* (2013.01); *C01B 2203/0244* (2013.01); *C01B 2203/025* (2013.01); *C01B 2203/0261* (2013.01); *C01B 2203/0283* (2013.01); *C01B 2203/0288* (2013.01); *C01B 2203/0405* (2013.01); *C01B 2203/0415* (2013.01); *C01B 2203/0445* (2013.01); *C01B 2203/0475* (2013.01); *C01B 2203/0495* (2013.01); *C01B 2203/068* (2013.01); *C01B 2203/0811* (2013.01); *C01B 2203/0883* (2013.01); *C01B 2203/1041* (2013.01); *C01B 2203/1235* (2013.01); *C01B 2203/1288* (2013.01); *C01B 2203/142* (2013.01); *C01B 2203/147* (2013.01); *C01B 2203/148* (2013.01); *C01B 2203/84* (2013.01)
USPC .......................... 252/373; 48/197 R; 422/146

(58) Field of Classification Search
CPC .............. C01B 3/02; C01B 2203/0833; C01B 2203/0805; C01B 2203/0872
USPC .......................... 252/373; 48/197 R; 422/146
See application file for complete search history.

(56) References Cited

U.S. PATENT DOCUMENTS

| | | | |
|---|---|---|---|
| 3,442,613 | A | 5/1969 | Grotz, Jr. |
| 3,572,046 | A | 3/1971 | Grotz, Jr. |
| 4,549,890 | A | 10/1985 | Bligh |
| 4,904,455 | A | 2/1990 | Karafian et al. |
| 5,006,131 | A | 4/1991 | Karafian et al. |

(Continued)

FOREIGN PATENT DOCUMENTS

| | | |
|---|---|---|
| EP | 0 227 807 B1 | 11/1991 |
| WO | 2006/117499 A1 | 11/2006 |
| WO | 2008/122399 A1 | 10/2008 |

*Primary Examiner* — Stanley Silverman
*Assistant Examiner* — Syed Iqbal
(74) *Attorney, Agent, or Firm* — Gary M. Machetta

(57) ABSTRACT

A method can include combusting an expanded turbine exhaust and a first fuel within a first reformer to produce a first exhaust. A hydrocarbon can be reformed in the first reformer to produce a reformed hydrocarbon and heat can be transferred from the first exhaust to a first medium. A refrigeration unit can be powered with thermal energy from the heated first medium and can cool a second medium. Heat can be transferred from one or more oxidants to the cooled second medium to produce cooled first and second oxidants. The cooled first oxidant and a second fuel can be introduced to a gas turbine unit to produce the expanded turbine exhaust and mechanical power. The cooled second oxidant can be compressed in a compressor powered with the mechanical power and the compressed second oxidant and the reformed hydrocarbon can be introduced to a second reformer to produce a syngas.

20 Claims, 1 Drawing Sheet

(56) References Cited

U.S. PATENT DOCUMENTS

| | | |
|---|---|---|
| 5,011,625 A | 4/1991 | Le Blanc |
| 5,118,395 A * | 6/1992 | Chen et al. .................... 205/634 |
| 5,181,937 A | 1/1993 | Karafian et al. |
| 5,496,859 A | 3/1996 | Fong et al. |
| 7,220,505 B2 | 5/2007 | Malhotra et al. |
| 7,435,401 B2 | 10/2008 | Barnett et al. |
| 7,670,586 B2 | 3/2010 | Wang et al. |
| 2003/0027096 A1 | 2/2003 | Barnett et al. |
| 2005/0080146 A1 * | 4/2005 | Abbott et al. ................ 518/703 |
| 2007/0010590 A1 | 1/2007 | Abbott et al. |
| 2008/0161428 A1 * | 7/2008 | Strait ............................ 518/702 |
| 2010/0224061 A1 * | 9/2010 | Grover ............................. 95/93 |

* cited by examiner

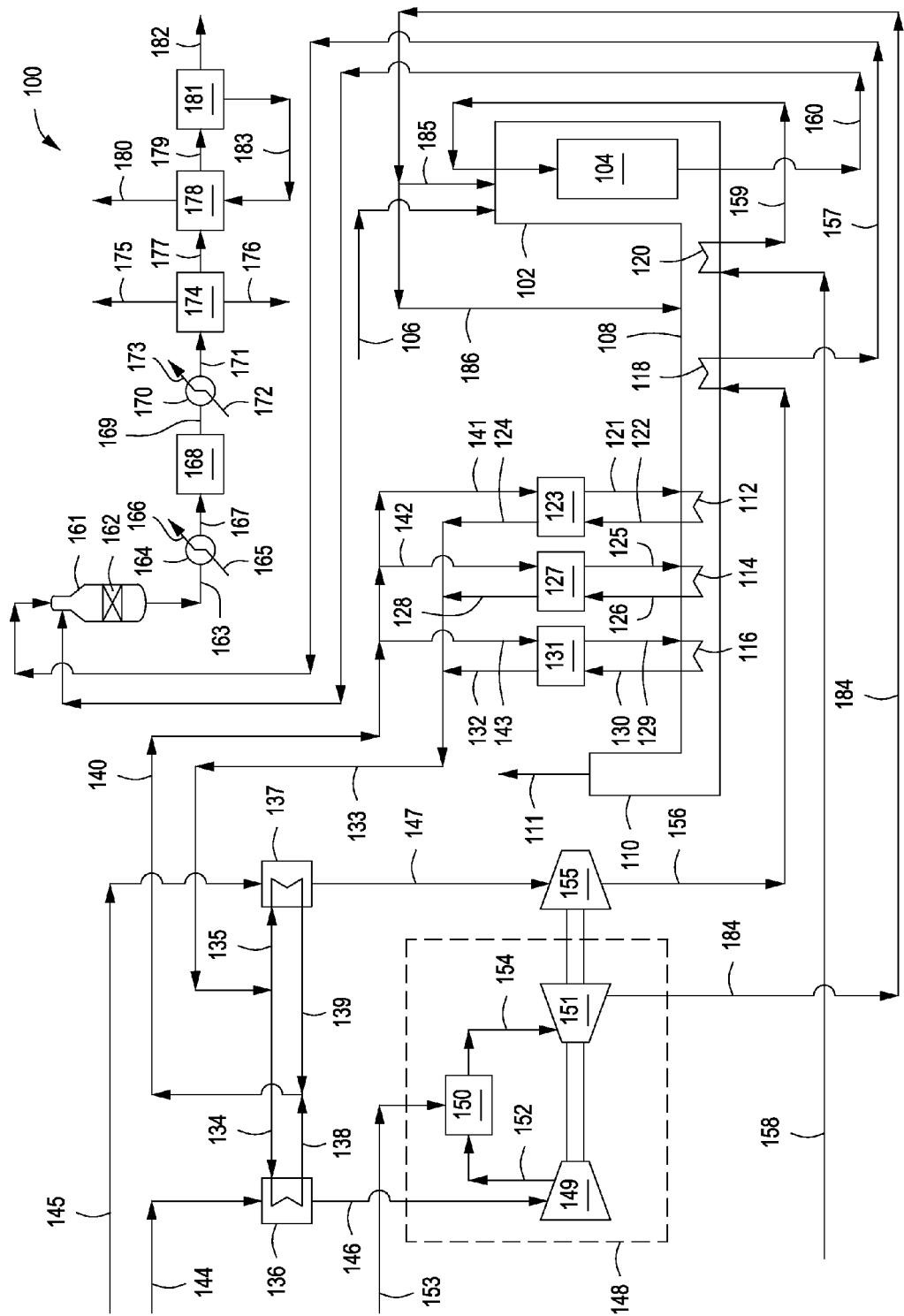

SYSTEMS AND METHODS FOR PRODUCING SYNGAS AND PRODUCTS THEREFROM

BACKGROUND

1. Field

Embodiments described herein generally relate to systems and methods for producing syngas. More particularly, such embodiments relate to systems and methods for increasing syngas production and products made therefrom.

2. Description of the Related Art

Conventional syngas plants use gas turbines to power compressors that, for example, provide compressed process air to a secondary reformer for reaction. Using ammonia production as an example, a frame-5 gas turbine can power a compressor of sufficient size such that 1,850 tons ammonia per day are produced. Plant capacities can be increased by increasing the mass flow rate of compressed air provided by the compressor to the secondary reformer. For instance, a frame-6 gas turbine has a greater power output than a frame-5 gas turbine and, as a result, a frame-6 gas turbine can provide an increased mass flow rate of compressed air from the compressor to the secondary reformer. The output difference between a frame-5 gas turbine and a frame-6 gas turbine, however, is so large that a frame-6 gas turbine would not be economical because it could not be fully utilized.

One approach to increase the production of ammonia is to provide chilled air to the gas turbine and compressor which increases the mass flow rate of compressed air introduced to the secondary reformer. The additional ammonia produced using current cooling systems, however, is not economical because the energy costs required to chill the air exceed the revenue generated from the additional ammonia.

There is a need, therefore, for improved systems and methods for increasing syngas production.

BRIEF DESCRIPTION OF THE DRAWING

The FIGURE depicts a schematic view of an illustrative system for producing syngas and products therefrom, according to one or more embodiments described.

DETAILED DESCRIPTION

Systems and methods for reforming a hydrocarbon are provided. The method can include combusting at least a portion of an expanded turbine exhaust gas and a first fuel within a first reformer to produce a first reformer exhaust gas. A hydrocarbon can be reformed in the first reformer in the presence of one or more first catalysts and steam at conditions sufficient to produce a first reformed hydrocarbon. One or more first transfer mediums can be heated by indirectly transferring heat from the first reformer exhaust gas to the one or more first transfer mediums. One or more refrigeration units can be powered with thermal energy from the one or more heated first transfer mediums. One or more second transfer mediums within the one or more refrigeration units can be cooled to produce one or more cooled second transfer mediums. Heat from an oxidant can be transferred to the one or more cooled second transfer mediums to produce a cooled first oxidant and a cooled second oxidant. The first cooled oxidant and a second fuel can be introduced to a gas turbine unit to produce the expanded turbine exhaust gas and mechanical power. The compressor can be powered with the mechanical power. The cooled second oxidant can be compressed in the compressor to produce a compressed second oxidant. The compressed second oxidant and the first reformed hydrocarbon can be introduced to a second reformer to produce a syngas product.

The FIGURE depicts a schematic view of an illustrative system 100 for producing syngas, according to one or more embodiments. The system 100 can include one or more gas turbine units 148, one or more compressors 155, one or more refrigeration units (three are shown 123, 127, 131), one or more heat exchangers (two are shown 136, 137), one or more first or "primary" reformers 102, and one or more second or "secondary" reformers 161. The primary reformer 102 can be a steam methane reformer ("SMR") that can include a combination of radiant and convective reformers. For example, the primary reformer 102 can include one or more radiantly-heated reformer tubes (one is shown 104), which can be disposed in any orientation, for example, horizontal or vertical. The reformer tubes 104 can be single-walled tubes. The reformer tubes 104 can contain a first catalyst or first reforming catalyst. In one or more embodiments, the primary reformer 102 can include about 200 or more, about 400 or more, about 600 or more, about 800 or more, or about 1,000 or more reformer tubes 104.

A fuel via line 106 can be introduced to the primary reformer 102 and combusted to generate heat and an exhaust gas within the primary reformer 102. The fuel in line 106 can include one or more carbon containing materials such as hydrocarbons. Illustrative hydrocarbons suitable for use in the fuel can include, but are not limited to, methane, ethane, propane, butane, pentane, hexane, or any other hydrocarbon containing from about one to about sixty carbon atoms ($C_1$ to $C_{60}$), or any mixture thereof. In another example, the fuel in line 106 can include, but is not limited to, $C_1$ to $C_{20}$ hydrocarbons or any mixture thereof. In another example, the fuel in line 106 can include, but is not limited to, natural gas, methane, de-sulfurized natural gas, de-sulfurized methane, mixtures thereof, or any combination thereof. In another example, the fuel in line 106 can include, but is not limited to, low grade fuel sources rather than fresh natural gas or other high quality hydrocarbon feeds. Suitable low grade fuel sources can include, but are not limited to, biomass (i.e. plant and/or animal matter and/or plant and/or animal derived matter), coal (e.g. high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g. hydrocarbon waxes, blends thereof, and combinations thereof), hydrocarbon-based polymeric materials, petroleum coke, or any combination thereof. Other suitable low grade fuel sources can include off-gases produced from the gasification of biomass (i.e. plant and/or animal matter and/or plant and/or animal derived matter), coal (e.g. high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g. hydrocarbon waxes, blends thereof, and combinations thereof), hydrocarbon-based polymeric materials, petroleum coke, or any combination thereof. The hydrocarbon-based polymeric materials can include, but are not limited to, thermoplastics, elastomers, rubbers, polypropylenes, polyethylenes, polystrenes, other polyolefins, homo-polymers, co-polymers, block co-polymers, polyethylene terephthalate, poly blends, or any combination thereof.

Heated exhaust gas from the primary reformer 102 can pass through an exhaust duct 108 and exit via line 111 into the atmosphere through stack 110. Although not shown, the exhaust gas via line 111 can be introduced to one or more purification systems that can remove at least a portion of one or more impurities contained in the exhaust gas. As the heated exhaust gas flows through the exhaust duct 108, the exhaust gas can flow across or otherwise contact the heat exchangers 112, 114, 116, 118, 120, which can be at least partially located or disposed within the exhaust duct 108. Thermal energy or heat from the exhaust gas can be transferred to one or more heat transfer mediums flowing through the heat exchangers 112, 114, 116, 118, 120. In one, or more embodiments, the heat exchangers 112, 114, 116, 118, 120 can be or include one or more tubes or conduits. The heat exchangers 112, 114, 116, 118, and/or 120 can include straight tubes or conduits, wound or coiled tubes or conduits, or a combination thereof. For example, the heat exchangers 112, 114, 116, 118, 120 can be heating coils. The heat exchangers 112, 114, 116, 118, and/or 120 can include one or more surface enhancements (e.g. fins, static mixers, rifling, heat conductive packing, turbulence causing projections, or any combination thereof) that can increase the rate of heat transfer to the transfer medium flowing through the heat exchangers 112, 114, 116, 118, and/or 120.

In one or more embodiment, the heat exchangers 112, 114, 116 can recover thermal energy from the exhaust gas ranging from a low of about 2.0 Gcal/Hr, about 5.0 Gcal/Hr, or about 10 Gcal/Hr to a high of about 12 Gcal/Hr, about 15 Gcal/Hr, or about 18 Gcal/Hr. For example, the energy recovered can range from about 2.0 Gcal/Hr to about 18 Gcal/Hr, about 4 Gcal/Hr to about 16 Gcal/Hr, or about 6 Gcal/Hr to about 13 Gcal/Hr. Additionally, by transferring thermal energy from the exhaust gas to the heat exchangers 112, 114, 116 the temperature of the exhaust gas via line 111 recovered from the stack 110 can be reduced.

In one or more embodiments, the exhaust gas in line 111 can have a temperature ranging from a low of about 170° C., about 180° C., or about 190° C. to a high of about 200° C., about 250° C., or about 300° C. when waste heat from the exhaust gas is not transferred to the one or more transfer mediums flowing through the heat exchangers 112, 114, 116. For example, the exhaust gas in line 111 can have a temperature ranging from about 170° C. to about 200° C., about 180° C. to about 225° C., or about 190° C. to about 240° C. Transferring heat from the exhaust gas to the one or more transfer mediums flowing through the heat exchangers 112, 114, 116 can reduce the temperature of the exhaust gas in line 111 to less than about 170° C., less than about 160° C., less than about 150° C., less than about 140° C., less than about 130° C., less than about 120° C., less than about 110° C., or less than about 100° C. For example, the exhaust gas in line 111 can be at a temperature ranging from a low of about 70° C., about 90° C., or about 100° C. to a high of about 110° C., about 120° C., or about 140° C. when waste heat from the exhaust gas is transferred to the one or more transfer mediums flowing through the heat exchangers 112, 114, 116. In another example, the exhaust gas in line 111 can be at a temperature of about 110° C. to about 150° C., about 100° C. to about 130° C., or about 95° C. to about 125° C.

A first heat transfer medium via line 121 can be introduced to the first heat exchanger 112 to produce a heated first heat transfer medium via line 122. The heated first heat transfer medium can be at a temperature ranging from a low of about 150° C. to a high of about 200° C. Illustrative first heat transfer mediums can include, but are not limited to, water, steam, hot oil, or any combination thereof. If the first heat transfer medium in line 121 includes water, steam, or a mixture thereof, the heated first heat transfer medium in line 122 can be referred to as intermediate low pressure (ILP) steam. The ILP steam can be at a pressure ranging from a low of about 375 kPa, about 400 kPa, or about 450 kPa to a high of about 850 kPa, about 900 kPa, about 950 kPa, about 1,000 kPa, or about 1,100 kPa. For example, the ILP steam can have a pressure ranging from about 385 kPa to about 950 kPa, about 425 kPa to about 800 kPa, about 500 kPa to about 750 kPa, or about 390 kPa to about 1,000 kPa. The ILP steam can be at a temperature ranging from a low of about 140° C., about 150° C., or about 160° C. to a high of about 170° C., about 180° C., or about 210° C.

The heated first heat transfer medium via line 122 can be introduced to the refrigeration unit or "first" refrigeration unit 123. The heated heat first transfer medium can be used within the first refrigeration unit 123 to power or drive one or more absorption refrigerators. The one or more absorption refrigerators can use any desired refrigerant or combination of refrigerants. Illustrative refrigerants can include, but are not limited to, solutions of lithium bromide, ammonia, aqueous solutions of ammonia, or the like. In at least one example, the first refrigeration unit 123 can use a solution of lithium bromide. The first refrigeration unit 123 can be or include a single stage or a two stage absorption refrigerator (e.g., cascaded system) that can be powered by the heated first heat transfer medium introduced via line 122 thereto. In at least one example, the first refrigeration unit 123 can include a two stage absorption refrigerator that can operate with a coefficient of performance ranging from a low of about 0.52, about 0.6, or about 0.7 to a high of about 1.3, about 1.5, or about 1.6.

A second heat transfer medium introduced via line 141 to the first refrigeration unit 123 can be cooled or chilled therein and recovered via line 124 as a cooled second heat transfer medium. Heat from the second heat transfer medium can be indirectly exchanged or transferred to the refrigerant within the first refrigeration unit 123 to produce the cooled second heat transfer medium via line 124.

A third heat transfer medium via line 125 can be introduced to the second heat exchanger 114 to produce a heated third heat transfer medium via line 126. The heated third heat transfer medium can be at a temperature ranging from a low of about 60° C. to a high of about 120° C. Illustrative third heat transfer mediums can include, but are not limited to, water, steam, hot oil, any combination thereof, or the like. If the third heat transfer medium in line 125 includes water, steam, or a mixture thereof, the heated third heat transfer medium in line 126 can be referred to as low low pressure (LLP) steam. The LLP steam can be at a pressure ranging from a low of about 125 kPa, about 140 kPa, or about 150 kPa to a high of about 175 kPa, about 200 kPa, about 250 kPa, about 300 kPa, or about 350 kPa. For example, the LLP steam can have a pressure ranging from about 125 kPa to about 225 kPa, about 150 kPa to about 200 kPa, about 125 kPa to about 175 kPa, or about 150 kPa to about 180 kPa. The LLP steam can be at a temperature ranging from a low of about 100° C., about 110° C., or about 120° C. to a high of about 130° C., about 135° C., or about 140° C.

The heated third heat transfer medium via line 126 can be introduced to the second refrigeration unit 127. The heated third heat transfer medium can be used within the second refrigeration unit 127 to power or drive one or more absorption refrigerators. The one or more absorption refrigerators can use any desired refrigerant or combination of refrigerants. Illustrative refrigerants can include, but are not limited to, solutions of lithium bromide, ammonia, aqueous solutions of ammonia, or the like. In at least one example, the second refrigeration unit 127 can use a solution of lithium bromide. The second refrigeration unit 127 can be or include a single stage or a two stage absorption refrigerator that can be powered by the heated third heat transfer medium introduced via line 126 thereto. In at least one example, the second refrigeration unit 127 can include a single stage absorption refrigerator that can operate with a coefficient of performance ranging from a low of about 0.5, about 0.6, or about 0.7 to a high of about 0.8, about 0.9, or about 1.

A fourth heat transfer medium introduced via line 142 to the second refrigeration unit 127 can be cooled or chilled therein and recovered via line 128 as a cooled fourth heat transfer medium. Heat from the fourth heat transfer medium can be indirectly exchanged or transferred to the refrigerant within the second refrigeration unit 127 to produce the cooled fourth heat transfer medium via line 128.

A fifth heat transfer medium via line 129 can be introduced to the third heat exchanger 116 to produce a heated fifth heat transfer medium via line 130. The heated fifth heat transfer medium can be at a temperature ranging from a low of about 75° C., about 80° C., or about 88° C. to a high of 95° C., about 100° C., or about 110° C. Illustrative fifth heat transfer mediums can include, but are not limited to, water, hot oil, treated water, any combination thereof, or the like. If the fifth heat transfer medium includes water, the heated fifth transfer medium in line 130 can be referred to as heated or hot water.

The heated fifth heat transfer medium via line 130 can be introduced to the third refrigeration unit 131. The heated fifth heat transfer medium can be used within the third refrigeration unit 131 to power or drive one or more absorption refrigerators. The one or more absorption refrigerators can use any desired refrigerant or combination of refrigerants. Illustrative refrigerants can include, but are not limited to, solutions of lithium bromide, ammonia, aqueous solutions of ammonia, or the like. In at least one example, the third refrigeration unit 131 can use a solution of lithium bromide. The third refrigeration unit 131 can include a single stage or a two stage absorption refrigerator that can be powered by the heated fifth heat transfer medium introduced via line 130 thereto. In at least one example, the third refrigeration unit 131 can include a single stage absorption refrigerator that can operate with a coefficient of performance ranging from a low of about 0.5 or about 0.6 to a high of about 0.7 or about 0.8.

A sixth heat transfer medium introduced via line 143 to the third refrigeration unit 131 can be cooled or chilled therein and recovered via line 132 as a cooled sixth heat transfer medium. Heat from the sixth heat transfer medium can be indirectly exchanged or transferred to the refrigerant within the third refrigeration unit 131 to produce the cooled sixth heat transfer medium via line 132.

The first heat transfer medium via line 121, the third heat transfer medium via line 125, and the fifth heat transfer medium via line 129 can collectively be referred to as the "first medium" or "first transfer medium." As such, the first heat transfer medium via line 121 can also be referred to as the "first-first transfer medium," the third heat transfer medium via line 125 can also be referred to as the "second-first transfer medium," and the fifth heat transfer medium via line 129 can also be referred to as the "third-first transfer medium." Likewise, the heated first heat transfer medium via line 122 can also be referred to as the "first heated first transfer medium," the heated third heat transfer medium via line 126 can also be referred to as the "second heated first transfer medium," and the heated fifth heat transfer medium via line 130 can also be referred to as the "third heated first transfer medium." Similarly, the second heat transfer medium via line 141, the fourth heat transfer medium via line 142, and the sixth heat transfer medium via line 143 can collectively be referred to as the "second medium" or "second transfer medium." As such, the second heat transfer medium via line 141 can also be referred to as the "first-second transfer medium," the fourth heat transfer medium via line 142 can also be referred to as the "second-second transfer medium," and the sixth heat transfer medium via line 143 can also be referred to as the "third-second transfer medium." Likewise, the cooled second heat transfer medium via line 124 can also be referred to as the "first cooled second transfer medium," the cooled fourth heat transfer medium via line 126 can also be referred to as the "second cooled second transfer medium," and the cooled sixth heat transfer medium via line 130 can also be referred as the "third cooled second transfer medium."

Preferably, the second, fourth, and sixth heat transfer mediums can be the same type of medium. The cooled or chilled second, fourth, and sixth heat transfer mediums via lines 124, 128, and 132 can be mixed or combined with one another to form a single or "primary" cooled transfer medium via line 133. For example, the second, fourth, and sixth heat transfer mediums via lines 124, 128, and 132, respectively, can be introduced to a manifold or other collection device configured to combine the multiple cooled heat transfer mediums to produce the main cooled transfer medium via line 133. Although not shown, the cooled second, fourth, and sixth transfer mediums via lines 124, 128, and 132 can remain separate or independent of one another. As such, the second, fourth, and sixth transfer mediums can be or include different compositions from one another. In another example, two of the cooled second, fourth, and sixth heat transfer mediums via lines 124, 128, and 132 can be combined with one another in line 133 and the other cooled heat transfer medium can remain separate or independent therefrom.

Although three first transfer mediums, namely the first heat transfer medium via line 121, the third heat transfer medium via line 125, and the fifth heat transfer medium via line 130 are shown, any number of first transfer mediums can be used to drive or power any number of refrigeration units (three are shown) 123, 127, and 131. For example, one first transfer medium can be used to power or drive one, two, three, four, or more refrigeration units. The number of first transfer mediums can be one, two, three (as shown), four, five, six, seven, eight or more. Although three refrigeration units 123, 127, and 131 are shown, any number of refrigeration units can be used to produce the one or more cooled second heat transfer mediums. For example, the system 100 can include one, two, three (as shown), four, five, six, seven, eight or more refrigeration units. Although three second transfer mediums, namely the second heat transfer medium via line 124, the fourth heat transfer medium via line 128, and the sixth heat transfer medium via line 132 are shown, any number of second transfer mediums can be used to cool the one or more oxidants. For example, one second transfer medium can be cooled in the one or more refrigeration units to produce the cooled second transfer medium. The number of second heat transfer mediums can be one, two, three (as shown), four, five, six, seven, eight or more.

Although not shown, low, grade heat generated from other areas within the system 100 can be used to produce the cooled second, fourth, and sixth heat transfer mediums combined in line 133 using one or more single stage and two stage absorption refrigeration package units. For example, heat recovered by cooling a syngas product via line 163 produced downstream in the system 100 can be used as a source of heat within one or more of the refrigeration units 123, 127, and 131. Additionally, steam or other sources of heat from outside battery limit (OSBL) can, be imported into the system 100 and used to power one or more of the refrigeration units 123, 127, and 131. In one or more embodiments, the number of heat exchangers 112, 114, and/or 116 can vary, and the number and type of refrigeration units 123, 127, 131 can vary depending on the application.

The cooled second, fourth, and sixth heat transfer mediums via lines 124, 128, and 132 can have a temperature that is less than the environmental or surrounding ambient temperature. For example, if the environmental temperature where the system 100 is located is about 40° C., the temperature of the cooled second, fourth, and sixth heat transfer mediums can be less than 40° C. For example, cooled second, fourth, and sixth heat transfer mediums in lines 124, 128, and 132 can each have a temperature ranging from a low of about 0.5° C., about 1° C., or about 2° C. to a high of about 15° C., about 20° C., or about 25° C. For example, the temperature of the cooled heat transfer medium in line 133 can have a temperature ranging from about 4.5° C. to about 10° C., about 3° C. to about 15° C., about 5° C. to about 9° C., or about 6° C. to about 8° C. The temperature of the cooled second, fourth, and sixth heat transfer mediums in lines 124, 128, and 132 can be the same or different from one another. For example, the cooled second heat transfer medium in line 124 can be cooler than the fourth and sixth heat transfer mediums in lines 128 and 132, respectively. The main cooled heat transfer medium in line 133 can have a temperature ranging from a low of about 0.5° C., about 1° C., or about 2° C. to a high of about 15° C., about 20° C., or about 25° C.

The cooled transfer medium via line 133 can be split into a first portion via line 134 and a second portion via line 135. The cooled first portion via line 134 can be introduced to the heat exchanger 136, and the cooled second portion via line 135 can be introduced to the heat exchanger 137. A first oxidant via line 144 and a second oxidant via line 145 can also be introduced to the heat exchangers 136 and 137, respectively. Warmed transfer mediums via lines 138 and 129 and cooled or chilled first and second oxidants via lines 146 and 147 can be recovered from the heat exchangers 136 and 137, respectively. Heat can be transferred from the first and second oxidants to the first portion and the second portion of the cooled transfer mediums within the heat exchangers 136 and 137, respectively. As such, the cooled transfer mediums in lines 138 and 139 can be recovered from the heat exchangers 136 and 137, respectively, at a greater temperature than introduced thereto and the first and second oxidants via lines 146 and 147 can be recovered from the heat exchangers 136 and 137, respectively, at a cooler or lower temperature than introduced thereto.

The first and second portions of warmed transfer mediums via lines 138, 139 can be recombined with one another to form a combined warmed transfer medium via line 140. For example, the first and second portions of warmed transfer mediums via lines 138 and 139 can be introduced to a manifold or other device configured to combine the two into line 140. The warmed transfer medium via line 140 can split, divided, or otherwise separated into the second, fourth, and sixth transfer mediums via lines 141, 142, 143, respectively, and can be returned or recycled to the first, second, and third refrigeration units 123, 127, and 131, respectively. The warmed transfer medium via line 140 can be introduced to a manifold or other device configured to split, divide, or otherwise separate the warmed transfer medium into the second, fourth, and sixth transfer mediums via lines 141, 142, and 143, respectively.

The heat exchangers 136 and 137 can include any system, device, or combination of systems and/or devices capable of transferring heat from the first and second oxidants introduced via lines 144 and 145, respectively, to the first and second portions of the cooled transfer medium introduced via lines 134, and 135, respectively. Illustrative heat exchangers can include, but are not limited to, direct contact cooling, shell-and-tube, plate and frame, spiral wound, U-tube, and/or bayonet style heat exchangers. The heat exchangers 136 and/or 137 can also include surface enhancements (e.g. fins, static mixers, rifling, heat conductive packing, turbulence causing projections, or any combination thereof) that can increase the rate of heat transfer therein.

The temperature of the cooled first oxidant via line 146 can range from a low of about 1° C., about 5° C., or about 10° C. to a high of about 20° C., about 25° C., about 30° C., or about 35° C. For example, the temperature of the cooled first oxidant in line 146 can range from about 5° C. to about 35° C., about 10° C. to about 35° C., about 15° C. to about 30° C., about 12° C. to about 26° C., or about 20° C. to about 35° C. The temperature of the cooled oxidant via line 146 can be varied, adjusted, or otherwise altered to match a power demand of the gas turbine unit 148.

The temperature of the cooled second oxidant via line 147 can range from a low of about 1° C., about 5° C., or about 10° C. to a high of about 15° C., about 20° C., about 25° C., or about 30° C. For example, the temperature of the cooled second oxidant in line 147 can range from about 5° C. to about 25° C., about 10° C. to about 20° C., about 8° C. to about 18° C., about 6° C. to about 14° C., or about 7° C. to about 22° C.

Although not shown, a single heat exchanger can be used in place of the heat exchangers 136, 137 to produce the cooled oxidants via lines 146, 147. For example, a single oxidant (now shown) can be introduced to a single heat exchanger to produce a cooled oxidant that can then be split or divided into the cooled first and second oxidants in lines 146 and 147, respectively. In another example, a single heat exchanger having two separate or independent flow paths for the first and second oxidants introduced via lines 144 and 145 thereto can be used to produce the cooled first and second oxidants via lines 146 and 147.

The cooled first oxidant via line 146 can be introduced to the gas turbine unit 148. Although not shown, one or more demisting pads, adsorbent materials, and the like can be used to remove moisture from the cooled oxidant in line 146 before it is introduced to the gas turbine unit 148. The gas turbine unit 148 can include a compressor 149, a combustor 150, and an expander 151. The cooled first oxidant via line 146 can be introduced to the compressor 149 and the compressor 149 can produce a compressed first oxidant via line 152, which can then be introduced to the combustor 150. A fuel via line 153 can also be introduced to the combustor 150. The fuel can include, but is not limited to, gasoline, natural gas, propane, diesel, kerosene, E-85 ethanol, biodiesel, biogas, other hydrocarbons having from 1 to 40 carbon atoms, or any combination thereof. The compressed first oxidant and the fuel can be mixed and combusted to provide a heated combustion product or exhaust gas via line 154. The combustion product via line 154 can be introduced to the expander 151, which can produce mechanical, power and an expanded exhaust gas or expanded turbine exhaust gas via line 184. The mechanical power can be used to drive or power the one or more compressors 155.

The cooled second oxidant via line 147 can be introduced to the compressor 155. Although not shown, one or more demisting pads, adsorbent materials, or the like can be used to remove moisture from the cooled second oxidant in line 147 before it is introduced to the compressor 155. The compressor 155 can compress the cooled second oxidant in line 147 to produce a compressed oxidant via line 156. The compressor 155 can include any type of compressor. Illustrative compressors can include, but are not limited to, axial compressors, centrifugal compressors, rotary positive displacement compressors, diagonal or mixed-flow compressors, reciprocating compressors, dry screw compressors, oil flooded screw compressors, scroll compressors, and the like.

Cooling the first oxidant in line 144 and introducing the cooled first oxidant via line 146 to the gas turbine unit 148 can increase the density of the first oxidant, which can increase the power output of the gas turbine unit 148. For example, using the cooled first oxidant as opposed to a first oxidant at ambient or environmental temperature can increase the power output of the gas turbine unit 148 by about 3%, about 5%, about 7%, about 12%, about 15%, about 18%, or about 25%. As such, the cooled first oxidant as compared to a first oxidant at ambient or environmental conditions can also increase the exhaust flow rate via line 184 exiting the gas turbine unit 148. For example, the exhaust flow rate and hence its oxygen flow rate in line 184 can be increased by about 3%, about 5%, about 7%, about 12%, or about 25%. Increasing the power output of the gas turbine unit 148 can increase the output of the compressor 155, thereby increasing the mass flow rate of the compressed oxidant via line 156. Additionally, the mass flow rate of the second oxidant in line 147 can be further increased by cooling the second oxidant within the heat exchanger 137. An increased mass flow rate of compressed oxidant via line 156 can increase the rate of syngas product produced within the second reformer 161.

Additionally, cooling the first and second oxidants introduced via lines 146, and 147, respectively, to the gas turbine unit 148 and to the compression unit 155 can allow the compression unit 155 to maintain a high mass flow rate of compressed oxidant via line 156 in environments with varying ambient air temperatures. For example, in warm or hot ambient air temperatures (e.g., about 30° C. to about 50° C.), syngas production can range from about 1,850 tons per day to about 2,500 tons per day using a frame-5 gas turbine by introducing the cooled first and second oxidants via lines 146 and 147 to the gas turbine unit 148 and the compression unit 155, respectively. For example, syngas production can be increased to about 2,200 tons per day. As such, the overall energy efficiency of ammonia production from the plant can be improved by about 0.05 Gcal/ton of ammonia, about 0.10 Gcal/ton of ammonia, or about 0.20 Gcal/ton of ammonia. For example, the overall energy efficiency of ammonia production from the plant can improve in an amount ranging from a low of about 0.05 Gcal/ton of ammonia, about 0.08 Gcal/ton of ammonia, or about 0.12 Gcal/ton of ammonia to a high of about 0.15 Gcal/ton of ammonia, about 0.18 Gcal/ton of ammonia, or about 0.2 Gcal/ton of ammonia.

The first and second oxidants in lines 144 and 145, respectively, can be or include any suitable oxygen containing material or combination of materials. Illustrative oxidants can include, but are not limited to, air, oxygen, essentially oxygen, oxygen-enriched air, oxygen-lean air, hydrogen peroxide, ozone, a mixture of oxygen and one or more gases such as air, water, carbon dioxide, nitrogen, hydrogen peroxide, ozone, and/or argon, or any combination thereof. The first and second oxidants in lines 144 and 145 can contain from about 1 vol % to about 100 vol % oxygen. As used herein, the term "essentially oxygen" refers to an oxidant containing more than 50 vol % oxygen. For example, an essentially oxygen fluid could contain from about 55 vol % to about 100 vol % oxygen. As used herein, the term "oxygen-enriched air" refers to an oxidant containing more than about 21 vol % oxygen and up to 50 vol % oxygen. As used herein, the term "oxygen-rich" refers to both oxygen-enriched air and essentially oxygen. As used herein, the term "oxygen-lean air" refers to an oxidant containing less than about 20 vol % oxygen. The oxidant in line 118 can be nitrogen-free or essentially nitrogen-free. As used herein, the term "essentially nitrogen-free" refers to an oxidant in line 118 containing about 5 vol % nitrogen or less, 4 vol % nitrogen or less, 3 vol % nitrogen or less, 2 vol % nitrogen or less, or 1 vol % nitrogen or less. Oxygen, essentially oxygen, and/or oxygen-enriched air can be produced from any number of conventional oxygen enrichment systems, such as an air separation unit. In at least one example, the first oxidant in line 144 can be air. In at least one example, the second oxidant in line 145 can be air.

At least a portion of the expanded turbine exhaust gas in line 184 can be introduced with the fuel in line 106 to the first reformer 102 to produce the exhaust gas therein. For example, a first portion of the expanded turbine exhaust gas in line 184 can be introduced via line 185 to the first reformer 102 and a second portion of the expanded turbine exhaust gas in line 184 can be introduced via line 186 to the exhaust duct 108. In another example all of the expanded turbine exhaust gas in line 184 can be introduced via line 185 to the primary reformer 102. In another example, all of the expanded turbine exhaust gas in line 184 can be introduced via line 186 to the exhaust duct 108. The amount of the expanded turbine exhaust gas via line 185 introduced to the first reformer 102 can range from a low of about 70%, about 75%, or about 80% to a high, of about 90%, about 95%, or about 100% of the total amount of expanded turbine exhaust gas in line 184. For example, the amount of the expanded turbine exhaust gas in line 184 that can be introduced to the first reformer 102 can range from about 70% to about 80%, or about 90% to about 95%. The expanded turbine exhaust gas can provide, the source of oxidant required for combustion. Although not shown, supplemental oxidant can also be introduced to the first reformer 102 and used to combust the fuel introduced via line 106.

The compressed oxidant via line 156 can be introduced, to the fourth heat exchanger or heating coil 118 that can be at least partially disposed within the exhaust duct 108 to produce a heated compressed oxidant via line 157. The heated compressed oxidant via line 157 can be introduced to the second reformer 161. The heated compressed oxidant in line 157 can have a temperature ranging from a low of about 450° C., about 500° C., or about 550° C. to a high of about 600° C., about 650° C., or about 700° C. The pressure of the heated compressed air in line 157 can range from a low of about 700 kPa, about 1,000 kPa, or about 1,400 kPa to a high of about 5,000 kPa, about 7,000 kPa, or about 9,000 kPa. For example, the pressure of the compressed oxidant in line 157 can range from about 1,500 kPa to about 8,000 kPa, about 2,900 kPa to about 7,900 kPa, or about 3,500 kPa to about 7,500 kPa.

One or more hydrocarbons and steam can be introduced via line 158 to the fifth heat exchanger or heating coil 120 that can be at least partially disposed within the exhaust duct 108 to produce an a preheated hydrocarbon feed via line 159. The preheated steam hydrocarbon mixture in line 159 can be heated to a temperature ranging from a low of about 400° C., about 450° C., or about 500° C. to a high of about 550° C., about 600° C., or about 650° C. Although not shown, the preheated hydrocarbon in line 159 can be further heated by one or more additional heat exchangers. The preheated hydrocarbon in line 159 can be introduced to the reformer tubes 104 in the primary reformer 102 and exit the primary reformer 102 as a first reformed hydrocarbon or effluent via line 160. Although not shown, the hydrocarbon and steam can be separately preheated and introduced to the reformer tubes 104.

The hydrocarbon in line 158 can be or include one or more liquid or gaseous hydrocarbons, mixtures thereof, or any combination thereof. The hydrocarbon in line 158 can include any one or more $C_1$ to $C_{12}$ hydrocarbons, hydrogen, or any combination thereof. For example, the hydrocarbon in line 158 can include methane, ethane, propane, butane, pentane, hexane, hydrogen, or any combination thereof. The methane concentration in the hydrocarbon in line 158 can range from a low of about 30 mol %, about 50 mol %, or about 75 mol % to a high of about 95 mol %, about 99 mol %, or about 99.9 mol % with the balance including $C_2$, $C_3$, and heavier hydrocarbons. For example, the hydrocarbon in line 158 can have a methane concentration of about 55 mol % or more, about 60 mol % or more, about 65 mol % or more, about 70 mol % or more, about 75 mol % or more, about 80 mol % or more, about 85 mol % or more, or about 90 mol % or more. The hydrogen concentration in the hydrocarbon in line 158 can range from a low of about 0.1 mol %, about 1 mol %, or about 5 mol % to a high of about 20 mol %, about 30 mol %, or about 35 mol %. For example, the hydrocarbon in line 158 can have a hydrogen concentration of about 30 mol % or less, about 25 mol % or less, about 20 mol % or less, about 15 mol % or less, about 10 mol % or less, about 5 mol % or less, or about 1 mol % or less.

The hydrocarbon and steam in line 158 can have a steam-to-carbon molar ratio (or steam-to-carbon content of the hydrocarbon) ranging from a low of about 2.3, about 2.5, about 2.7, about 2.8, or about 2.9 to a high of about 3.1, about 3.2, about 3.4, about 3.5, about 3.6, about 3.7, about 3.8, about 3.9, or about 4. For example, the hydrocarbon and steam in line 158 can have a steam-to-carbon molar ratio of about 2.6 to about 4, about 2.8 to about 3.8, about 3 to about 4, or about 2.9 to about 3.9.

The first reformed hydrocarbon in line 160 can include, but is not limited to, a portion of the hydrocarbon, hydrogen, carbon monoxide, carbon dioxide, steam, or any combination thereof. The first reformed hydrocarbon in line 160 can have a concentration of the hydrocarbon, i.e. non-reformed hydrocarbon from line 158, ranging from a low of about 3 mol %, about 5 mol %, or about 8 mol % to a high of about 30 mol %, about 35 mol %, or about 40 mol %. The first reformed hydrocarbon in line 160 can have a hydrogen concentration ranging from a low of about 5 mol %, about 10 mol %, about 15 mol %, or about 20 mol % to a high of about 55 mol %, about 60 mol %, about 65 mol %, or about 70 mol %. The first reformed hydrocarbon in line 160 can have a methane concentration ranging from a low of about 10 mol %, about 20 mol %, about 30 mol %, about 35 mol %, or about 40 mol % to a high of about 45 mol %, about 55 mol %, about 60 mol %, or about 65 mol %. The first reformed hydrocarbon in line 160 can have a carbon monoxide concentration ranging from a low of about 0.5 mol %, about 1 mol %, or about 2 mol % to a high of about 3 mol %, about 4 mol %, or about 5 mol %. The first reformed hydrocarbon in line 160 can have a carbon dioxide concentration ranging from a low of about 5 mol %, about 7%, or about 9 mol % to a high of about 12 mol %, about 15 mol %, or about 17 mol %.

In at least specific embodiment, the first reformed hydrocarbon in line 160 can have a hydrogen concentration of from about 60 mol % to about 65 mol %, a methane concentration of from about 10 mol % to about 15 mol %, a carbon monoxide concentration of from about 5 mol % to about 10 mol %, a carbon dioxide concentration of from about 5 mol % to about 15 mol %, and a concentration of the hydrocarbon ranging from about 15 mol % to about 40 mol %, with other components such as $C_2$ and heavier hydrocarbons being absent or minimally present, for example at less than about 1 mol %, less than about 0.5 mol %, less than about 0.4 mol %, less than about 0.3 mol %, or less than about 0.1 mol %.

The first reformed hydrocarbon in line 160 can be at a temperature ranging from a low of about 600° C., about 650° C., about 700° C., or about 800° C. to a high of about 830° C., about 840° C., or about 850° C. The pressure of the first reformed hydrocarbon in line 160 can range from a low of about 700 kPa, about 1,000 kPa, or about 1,400 kPa to a high of about 4,000 kPa, about 5,000 kPa, or about 6,000 kPa.

The first reformed hydrocarbon via line 160 and the heated compressed oxidant via line 159 can be introduced to the second reformer 161. The second reformer 161 can be or include an autothermal reformer (ATR), a catalytic partial oxidation reactor (CPOX), a partial oxidation reactor (POX), or a combination thereof. For example, the second reformer 161 can be an ATR that can include one or more catalyst beds 162, which can at least partially reform the first reformed hydrocarbon in line 160. The catalyst beds 162 can include a single type of catalyst or a mixture of different types of catalysts. In another example, the catalyst beds 162 can include two catalyst beds with a first catalyst bed having a first catalyst and a second catalyst bed having a second catalyst that is different from the first catalyst. The heated compressed air can be used to partially combust a portion of the first reformed hydrocarbon, providing heat that drives an endothermic reforming reaction within the catalyst beds 162 disposed in the second reformer 161.

The syngas or syngas product via line 163 can be recovered from the second reformer 161. The syngas in line 163 can have a temperature ranging from a low of about 875° C., about 950° C., or about 1,000° C. to a high of about 1,050° C., about 1,075° C., or about 1,100° C. The pressure of the syngas in line 163 can range from a low of about 700 kPa, about 1,000 kPa, or about 1,400 kPa, to a high of about 4,000 kPa, about 5,000 kPa, or, about 6,000 kPa.

The syngas in line 163 can contain hydrogen, carbon monoxide, carbon dioxide, nitrogen, steam, and other minor components, such as argon and/or methane. The syngas in line 163 can have a hydrogen concentration ranging from about 35 mol % to about 80 mol % or about 50 mol % to about 80 mol %. For example, the syngas in line 163 can have a hydrogen concentration ranging from a low of about 35 mol %, about 40 mol %, about 43 mol %, or about 45 mol % to a high of about 53 mol %, about 55 mol %, about 60 mol %, or about 65 mol %. The syngas in line 163 can have a methane concentration of less than about 10 mol %, less than about 8 mol %, less than about 6 mol %, less than about 4 mol %, less than about 2 mol %, less than about 1 mol %, less than about 0.5 mol %, less than about 0.3 mol %, or less than about 0.1 mol %. For example, the methane concentration of the syngas can range from about 0.1 mol % to about 0.5 mol %, about 0.1 mol % to about 4 mol %, about 0.3 mol % to about 1 mol %, or about 0.6 mol % to about 1.6 mol %. The syngas in line 163 can have a carbon monoxide concentration ranging from a low of about 5 mol %, about 7 mol %, about 9 mol %, or about 11 mol % to a high of about 13 mol %, about 15 mol %, about 17 mol %, or about 20 mol %. The syngas in line 163 can have a carbon dioxide concentration ranging from a low of about 5 mol %, about 7 mol %, about 9 mol %, or about 11 mol % to a high of about 13 mol %, about 15 mol %, about 17 mol %, or about 20 mol %. The syngas in line 163 can have a nitrogen concentration ranging from a low of about 10 mol %, about 20 mol %, or about 30 mol % to a high of about 35 mol %, about 37 mol %, or about 40 mol %. The syngas in line 163 can have an argon concentration of less than about 5 mol %, less than about 4 mol %, less than about 3 mol %, less than about 2 mol %, less than about 1 mol %, or less than about 0.5 mol %. In at least one specific embodiment, the syngas in line 163 can have a hydrogen concentration of from about 50 mol % to about 80 mol %, a carbon monoxide concentration of from about 5 mol % to about 20 mol %, a carbon dioxide concentration of from about 5 mol % to abut 20 mol %, a nitrogen concentration of about 20 mol % to about 40 mol %, an argon concentration of less than about 2 mol %, and a methane concentration of from about 0.1 mol % to about 4 mol %.

In various other embodiments, the syngas in line 163 can have a hydrogen content ranging from a low of about 45 mol %, about 47 mol %, or about 49 mol % to a high of about 51 mol %, about 53 mol %, or about 55 mol %. The syngas in line 163 can have a carbon monoxide content ranging from a low of about 9 mol % or about 10 mol % to a high of about 11 mol % or about 12 mol %. The syngas in line 163 can have a carbon dioxide content ranging from a low of about 6 mol % or about 7 mol % to a high of about 8 mol %, or about 9 mol %. The syngas in line 163 can have a nitrogen content ranging from a low of about 28 mol %, about 29 mol %, or about 30 mol % to a high of about 33 mol %, about 34 mol %, or about 35 mol %. The syngas in line 163 can have a methane content of less than about 1 mol %, less than about 0.5 mol %, or less than about 0.3 mol %. For example, the methane content of the syngas in line 163 can range from about 0.5 mol % to about 0.7 mol %. The syngas in line 163 can have a hydrogen content of from about 47 mol % to about 53 mol %, a carbon monoxide content of from about 10 mol % to about 11 mol %, a carbon dioxide content of from about 7 mol % to about 9 mol %, a nitrogen content of about 29 mol % to about 32 mol %, and a methane content of less than about 0.6 mol %.

The syngas in line 163 can have a temperature ranging from a low of about 950° C., about 975° C., or about 1,000° C. to a high of about 1,050° C., about 1,075° C., or about 1,100° C. The pressure of the syngas in line 163 can range from a low of about 700 kPa, about 1,000 kPa, or about 1,400 kPa to a high of about 4,000 kPa, about 5,000 kPa, or about 6,000 kPa.

The syngas in line 163 can be introduced to one or more heat exchangers (one is shown) 164 to cool the syngas in line 163. Heat can be indirectly transferred in the heat exchanger 164 from the syngas introduced via line 163 to a heat transfer medium introduced via line 165. Suitable heat transfer mediums introduced via line 165 can include, but are not limited to, water, waste water, air, other process feeds from within the plant, mixtures thereof, or combinations thereof. For example, the heat transfer medium in line 165 can be boiler feed water. In one or more embodiments, steam via line 166 and a cooled syngas product via line 167 can be recovered from the heat exchanger 164.

The steam provided from the indirect heat exchange via line 166 can be low pressure steam, medium pressure steam, or high pressure steam. In one or more embodiments, the steam in line 166 can have a temperature of about 200° C. or more, 300° C. or more, 400° C. or more, 450° C. or more, 475° C. or more, or 500° C. or more. In one or more embodiments, the pressure of the steam in line 166 can range from a low of about 200 kPa, about 400 kPa, or about 600 kPa to a high of about 4,200 kPa, about 6,200 kPa, about 8,500 kPa, or about 12,500 kPa or more.

The heat exchanger 164 can be or include any system, device, or combination of systems and/or devices suitable for indirectly transferring heat from one fluid to another fluid. For example, the heat exchanger 164 can be or include one or more shell-and-tube, plate and frame, spiral wound, U-tube, and/or bayonet style heat exchangers. In one or more embodiments, the heat exchanger 164 can include surface enhanced tubes (e.g. fins, static mixers, rifling, heat conductive packing, turbulence causing projections, or any combination thereof), and the like.

In one or more embodiments, the cooled syngas in line 167 can be introduced to one or more shift converter systems (one is shown) 168 to provide a shift converted syngas in line 169. The shift converter system 168 can adjust the hydrogen to carbon monoxide ratio ("$H_2$:CO") of the syngas by converting carbon monoxide to carbon dioxide. Within the shift converter system 168, a water-gas shift reaction can react at least a portion of the carbon monoxide in the cooled syngas introduced via line 167 with water in the presence of a catalyst and/or high temperature to produce hydrogen and carbon dioxide. The one or more shift reactors can include, but are not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof. For example, a sorption enhanced water-gas shift (SEWGS) process, utilizing a pressure swing adsorption unit having multiple fixed bed reactors packed with shift catalyst and high temperature (around 475° C.) carbon dioxide adsorbent, can be used.

In one or more embodiments, the shift converter system 168 can include two or more reactors arranged in series and/or parallel. The shift converter system 168 can include one or more high temperature shift converters (HTSC), one or more medium temperature shift converters (MTSC), one or more low temperature shift converters (LTSC), or any combination thereof. In one or more embodiments, at least a portion of the syngas in line 167 can be introduced to one or more HTSCs, MTSCs, and/or LTSCs in any order and/or combination thereof.

The shift converted syngas provided via line 169 can contain less carbon monoxide than the cooled syngas introduced via line 167. The converted syngas in line 169 can contain about 5 mol % or less dry basis carbon monoxide, about 3 mol % or less dry basis carbon monoxide, about 2 mol % dry basis or less carbon monoxide, about 1 mol % or less dry basis carbon monoxide, or about 0.5 mol % dry basis or less dry basis carbon monoxide.

The syngas in line 167 can be apportioned equally or unequally to any one or more of the HTSCs, MTSCs, LTSCs. For example, about 75% vol of the cooled syngas in line 167 can be introduced to a HTSC and about 25% can be introduced to a MTSC.

In one or more embodiments, the one or more HTSCs, MTSCs, and/or LTSCs can contain one or more catalysts. The one or more HTSCs, MTSCs, and LTSCs can convert carbon monoxide in the cooled syngas in line 167 to carbon dioxide by reacting the carbon monoxide in the presence of one or more catalysts within in the one or more HTSCs, MTSCs, and/or LTSCs, at a temperature sufficient to oxidize the carbon monoxide. The catalyst within the one or more HTSCs can include, but is not limited to iron oxide, zinc ferrite, magnetite, chromium oxides, derivatives thereof, or any combination thereof. The one or more HTSCs can be operated at a temperature of from about 325° C. to about 550° C. The catalyst disposed in the one or more MTSCs can include, but is not limited to, iron oxide, chromium oxide, derivatives thereof, or any combination thereof. The one or more MTSCs can be operated at a temperature of from about 250° C. to about 300° C. The catalyst disposed in the one or more LTSCs can include, but is not limited to, copper, zinc, copper promoted chromia, derivatives thereof, or any combination thereof. The one or more LTSC can be operated at a temperature from about 180° C. to about 220° C.

In one or more embodiments, the syngas via line 169 can be introduced to one or more heat exchangers (one is shown) 170 to provide a cooled shift converted syngas in line 171. Heat can be indirectly transferred from the shift converted syngas introduced via line 169 to a heat transfer medium introduced via line 172. In one or more embodiments, one or more suitable heat transfer mediums in line 172 can be introduced to the heat exchanger 170. The heat transfer medium introduced via line 172 can be, but is not limited to water, waste water, another process feed from within the plant, mixtures thereof, or combinations thereof In one or more embodiments, steam via line 173 can be provided, which can be low pressure steam, medium pressure steam, or high pressure steam. Although not shown, the syngas in line 169 can be directly cooled by introducing the one or more heat transfer mediums in line 165 to the syngas in line 169.

The heat exchanger 170 can be or include any system, device, or combination of systems and/or devices suitable for indirectly transferring heat from one fluid to another fluid. For example, the heat exchanger 170 can be or include one or more shell-and-tube, plate and frame, spiral wound, U-tube, and/or bayonet style heat exchangers. In one or more embodiments, the heat exchanger 170 can include surface enhanced tubes (e.g. fins, static mixers, rifling, heat conductive packing, turbulence causing projections, or any combination thereof), and the like.

In one or more embodiments, the cooled shift converted syngas in line 171 can be introduced to one or more syngas purification systems (one is shown) 174. In one or more embodiments, the syngas purification system 174 can include, but is not limited to one or more carbon dioxide removal systems, methanators, driers, or any combination thereof. In one or more embodiments, the cooled shift converted syngas can be introduced via line 171 to one or more carbon dioxide removal systems (not shown) within the syngas purification system 174 to remove at least a portion of the carbon dioxide.

The one or more carbon dioxide removal systems within the syngas purification system 174 can selectively separate carbon dioxide from the converted syngas to provide a carbon dioxide lean syngas and carbon dioxide. The separated carbon dioxide can be recovered via line 175. In one or more embodiments, the carbon dioxide lean syngas can optionally be introduced to the one or more methanators and/or the one or more driers within the purification system 174.

The carbon dioxide lean syngas can be introduced to the one or more methanators (not shown) within the purification system 174 to convert at least a portion of any carbon monoxide and/or carbon dioxide to methane and water. For example, the total carbon monoxide and carbon dioxide in the syngas can be less than about 1000 ppmw, less than about 750 ppmw, or less than about 500 ppmw of total carbon monoxide and carbon dioxide. In one or more embodiments, the syngas lean in carbon monoxide and, carbon dioxide can be introduced to the one or more driers within the purification system 174 to provide water via line 176 and a dried syngas. The one or more driers can remove or separate at least a portion of any water in the carbon monoxide and carbon dioxide lean syngas to provide the dried syngas.

The purification system 174 can provide or produce a syngas in line 177 which can have a hydrogen concentration ranging from a low of about 40 mol %, about 50 mol %, or about 55 mol % to a high of about 75 mol %, about 80 mol %, or about 85 mol %. The syngas in line 177 can have a nitrogen concentration ranging from a low of about 10 mol %, about 20 mol %, or about 25 mol % to a high of about 40 mol %, about 45 mol %, or about 50 mol %. The syngas in line 177 can have a methane concentration of less than about 4 mol %, less than about 3 mol %, less than about 2 mol %, less than about 1 mol %, or less than about 0.9 mol %. The syngas in line 177 can have an oxygen concentration from about 0.1 mol % to about 5 mol %, about 0.5 mol % to about 4 mol %, or about 0.8 mol % to about 3 mol %. The syngas in line 177 can have an argon concentration ranging from about 0.05 mol % to about 2 mol %, about 0.1 mol % to about 1.5 mol %, or about 0.1 mol % to about 1 mol %. The hydrogen to nitrogen ($H_2:N_2$) molar ratio can range from about 1.5:1 to about 5:1, from about 2:1 to about 4:1, or from about 22:1 to about 3.2:1. The $H_2:N_2$ molar ratio can be about 1.6:1, about 1.8:1, about 1.9:1, about 2.1:1, about 2.2:1, about 2.3:1, or about 2.4:1.

The pressure of the syngas in line 177 can range from about 1,000 kPa to about 20,800 kPa, about 2,000 kPa to about 13,700 kPa, or about 3,000 kPa to about 10,400 kPa. The temperature of the syngas in line 177 can range from about $-100°$ C. to about $100°$ C., about $-50°$ C. to about $50°$ C., or about $-25°$ C. to about $25°$ C.

The one or more carbon dioxide removal systems can include any one or a combination of physical, mechanical, electrical and/or chemical systems configured in series, parallel, or any combination thereof. In one or more embodiments, the one or more carbon dioxide removal systems can include one or more physical separation systems including, but not limited to, membrane type systems and solvent based systems. For example, the one or more carbon dioxide removal systems can include, but are not limited to, absorbtion/desorption type, solvent-based systems. The carbon dioxide removal system can contact the syngas introduced via line 171 with one or more absorbents to remove at least a portion of the carbon dioxide. Carbon dioxide selective adsorbents can include, but are not limited to, monoethanolamine (MEA), diethanolamine (DEA), triethanolamie (TEA), potassium carbonate, methyldiethanolamine (MDEA), activated methyldiethanolamine (aMDEA), diglycolamine (DGA), diisopropanolamine (DIPA), derivatives thereof, mixtures thereof, or any combination thereof. Other suitable adsorbents and techniques can include, but are not limited to, propylene carbonate physical adsorbent solvent as well as other alkyl carbonates, dimethyl ethers of polyethylene glycol of two to twelve glycol units (Selexol™ process), n-methyl-pyrrolidone, sulfolane, and use of the Sulfinol® Gas Treatment Process.

The one or more methanators can include any one or a combination of physical, mechanical, electrical and/or chemical systems to convert carbon monoxide and carbon dioxide to methane, configured either in series, parallel, or any combination thereof. In one or more embodiments, the one or more methanators can be a catalytic process operating at a temperature sufficient for converting or reacting at least a portion of any carbon monoxide and/or carbon dioxide to methane and water. The one or more catalytic process can include one or more catalytic reactors arranged in series or parallel, containing one or more catalysts suitable for the conversion of carbon monoxide and carbon dioxide to methane. Suitable methanator catalysts can include, but are not limited to, nickel, a rare earth promoted nickel, derivatives thereof, or combinations thereof. The methanator can operate at a temperature of from about $200°$ C. to about $400°$ C. The carbon monoxide and carbon dioxide lean syngas can contain about 50 ppm carbon monoxide and carbon dioxide or less, or about 30 ppm carbon monoxide and carbon dioxide or less, or about 10 ppm carbon monoxide and carbon dioxide or less.

The one or more driers can include, but are not limited to one or more molecular sieves, absorbents, adsorbents, flash tank separators, incinerators, or any combination thereof.

Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

In one or more embodiments, the syngas in line 177 can be introduced to the one or more purification systems (one is shown) 178, where one or more contaminants such as excess nitrogen, argon, oxygen, and methane can be removed to provide a contaminant-lean gas mixture or purified syngas via line 179. The purification system 178 can be used to remove or separate any contaminants, including excess nitrogen, i.e., nitrogen in excess of that necessary to provide a $H_2:N_2$ molar ratio of from about 2.2:1 to about 3.2:1, from the compressed gas mixture in line 177. In one or more embodiments, the purification system 178 can include one or more cryogenic-type separators operating at a temperature less than −150° C. The one or more contaminants and/or excess nitrogen can be removed from the purification system 178 as a waste gas via line 180.

In one or more embodiments, the $H_2:N_2$ molar ratio of the purified syngas in line 179 can range from about 2:1 to about 4:1, or from about 2.2:1 to about 3.2:1. For example, the $H_2:N_2$ molar ratio can be about 2.9:1, about 3:1, about 3.1:1, or about 3.2:1. The hydrogen concentration in the purified syngas in line 179 can range from about 50 mol % to about 90 mol %, about 60 mol % to about 85 mol %, or about 70 mol % to about 80 mol %. The nitrogen concentration in the purified syngas in line 179 can range from about 10 mol % to about 40 mol %, about 15 mol % to about 35 mol %, or about 20 mol % to about 30 mol %. The methane concentration in the purified syngas in line 179 can range from about 0.001 mol % to about 0.05 mol %, about 0.002 mol % to about 0.03 mol %, or about 0.005 mol % to about 0.01 mol %. The oxygen concentration in the purified syngas in line 179 can range from about 0.001 mol % to about 0.05 mol %, about 0.002 mol % to about 0.03 mol %, or about 0.005 mol % to about 0.01 mol %. The argon concentration in the purified syngas in line 179 can range from about 0.05 mol % to about 2 mol %, about 0.1 mol % to about 1.5 mol %, or about 0.1 mol % to about 1 mol %.

In one or more embodiments, the purified syngas via line 179 can be introduced to one or more ammonia synthesis systems (one is shown) 181. The ammonia synthesis system 181 can include one or more ammonia converters and one or more ammonia condensers. At least a portion of the nitrogen and hydrogen present in the purified syngas can be combined to provide an ammonia converter product (not shown). The ammonia concentration of the ammonia converter product can range from a low of about 5 mol %, about 10 mol %, or about 15 mol % to a high of about 25 mol %, about 30 mol %, or about 35 mol %. For example, the ammonia concentration of the ammonia converter product can range from about 12 mol % to about 25 mol % or from about 16 mol % to about 22 mol %. The hydrogen concentration of the ammonia converter product can range from a low of about 30 mol %, about 40 mol %, or about 50 mol % to a high of about 70 mol %, about 75 mol %, or about 80 mol %. The nitrogen concentration of the ammonia converter product can range from a low of about 5 mol %, about 10 mol %, or about 15 mol % to a high of about 30 mol %, about 35 mol %, or about 40 mol %.

In one or more embodiments, the one or more ammonia converters can be conventional single or multi-pass converters using one or more magnetite catalysts. In one or more embodiments, the one or more ammonia converters can be single or multi-pass converters using one or more noble metal catalysts, or one or more catalysts based upon ruthenium, such as the ruthenium-based KAAP catalyst available from Kellogg, Brown, and Root LLC. One or more higher activity, noble metal, catalysts can allow the use of lower pressures within the ammonia synthesis loop, thereby permitting use of a single barrel ammonia compressor (not shown).

The one or more ammonia converters can include any reactor capable of converting at least a portion of a feed gas containing nitrogen and hydrogen, e.g. the purified syngas, to ammonia. The ammonia converter can be or include one or more split-flow converters, isothermal ammonia converters, horizontal ammonia converters, ammonia converters adapted for high activity catalyst, cold wall converters, or any combination thereof. Suitable ammonia converters can be as discussed and described in U.S. Pat. Nos. 7,081,230; 6,171,570; 6,132,687; and U.S. Patent Application Publication Nos. 2009/0297427; and 2009/0136391.

The ammonia converter product can be introduced to the one or more ammonia condensers. The one or more ammonia condensers can condense and separate the ammonia to provide an ammonia product (the "finished product") in line 182 and unreacted hydrogen and/or nitrogen gas ("recycle syngas") or ("reject gas") in line 183. The finished product in line 182 can contain, but is not limited to ammonia, hydrogen, and nitrogen. The finished product can contain a minimum of about 85% wt, a minimum of about 90% wt, a minimum of about 95% wt, or a minimum of 99.9% wt ammonia. The finished product in line 182 can contain a maximum of about 15% wt, about 10% wt, about 5% wt or about 0.1% wt of combined hydrogen and nitrogen.

The recycle syngas in line 183 can be recycled to the purification unit 178 and/or to the one or more methanators and/or driers which can be included in the purification system 174, as discussed and described above. The hydrogen concentration in the recycled syngas in line 183 can range from about 40 mol % to about 90 mol %, about 50 mol % to about 85 mol %, or about 60 mol % to about 80 mol %. The nitrogen concentration in the recycled syngas in line 183 can range from about 10 mol % to about 60 mol %, about 15 mol % to about 50 mol %, or about 20 mol % to about 40 mol %.

Although not shown, the recycle syngas in line 183 can be separated to produce a hydrogen-rich recycle and a hydrogen-lean recycle. The hydrogen-rich recycle can be recycled via line 183 to the purification unit 178 and/or to the one or more methanators and/or driers and the hydrogen-lean recycle can be recycled (not shown) to the hydrocarbon in line 158, the first reformed hydrocarbon in line 160, and/or the fuel in line 106. Alternatively, the recycle gas via line 183 can be recycled to the purification unit 178, the hydrocarbon in line 158, the first reformed hydrocarbon in line 160, or any combination thereof.

Any portion of the recycle syngas in line 183 can be recycled to the hydrocarbon in line 158 and/or the first reformed hydrocarbon in line 160, and/or the fuel in line 106. For example, about 50% or more, about 60% or more, about 70% or more, about 80% or more, about 90% or more, or about 100% of the recycle syngas in line 183 can be recycled to the hydrocarbon in line 158. In another example, about 50% or more, about 60% or more, about 70% or more, about 80% or more, about 90% or more, or about 100% of the recycle syngas in line 183 can be introduced to the fuel in line 106 and used as low grade fuel for the first reformer 130. Recycling at least a portion of the recycle syngas in line 183 to the hydrocarbon in line 158 and/or the first reformed hydrocarbon in line 160 can recover methane and/or hydrogen from the purge gas, which can be used for the production of ammonia or other products. Furthermore, combusting about 20% to about 40% of the recycle syngas in line 183 can reduce or prevent accumulation of argon within the system 100, which can reduce or eliminate the need for the argon recovery unit (not shown). In another example, at least a portion of the waste gas via line 180 can be recycled to the hydrocarbon in line 158 and/or the first reformed hydrocarbon in line 160 to increase the amount of nitrogen therein.

The one or more ammonia condensers can include any mechanical or chemical system capable of selectively separating ammonia from a gas mixture including at least hydrogen and nitrogen. The one or more ammonia condensers can include one or more cryogenic purifiers containing one or more refrigeration exchangers and one or more refrigeration compressors.

Embodiments described herein further relate to any one or more of the following paragraphs:

1. A method for reforming a hydrocarbon, comprising: combusting at least a portion of an expanded turbine exhaust gas and a first fuel within a first reformer to produce a first reformer exhaust gas; reforming a hydrocarbon in the first reformer in the presence of one or more first catalysts and steam at conditions sufficient to produce a first reformed hydrocarbon; heating one or more first transfer mediums by indirectly transferring heat from the first reformer exhaust gas to the one or more first transfer mediums; powering one or more refrigeration units with thermal energy from the one or more heated first transfer mediums; cooling one, or more second transfer mediums within the one or more refrigeration units to produce one or more cooled second transfer mediums; transferring heat from one or more oxidants to the one or more cooled second transfer mediums to produce a cooled first oxidant and a cooled second oxidant; introducing the cooled first oxidant and a second fuel to a gas turbine unit to produce the expanded turbine exhaust gas and mechanical power; powering a compressor with the mechanical power; compressing the cooled second oxidant in the compressor to produce a compressed second oxidant; and introducing the compressed second oxidant and the first reformed hydrocarbon to a second reformer to produce a syngas product.

2. The method of paragraph 1, wherein the one or more first transfer mediums and the one or more second transfer mediums comprise water, steam, hot oil, or any combination thereof.

3. The method according to any one of paragraphs 1 and 2, wherein the one or more heated first transfer mediums comprise at least three transfer mediums, wherein a first heated first transfer medium comprises steam at a pressure of about 375 kPa to about 1,100 kPa, a second heated first transfer medium comprises steam at a pressure of about 125 kPa to about 350 kPa, and a third heated first transfer medium comprises water at a temperature of about 80° C. to about 100° C.

4. The method of paragraph 3, further comprising: introducing the first heated first transfer medium to a two stage lithium bromide absorption refrigeration unit to produce a first cooled second transfer medium; introducing the second heated first transfer medium to a first single stage lithium bromide absorption refrigeration unit to produce a second cooled second transfer medium; introducing the third heated first transfer medium to a second single stage lithium bromide absorption refrigeration unit to produce a third cooled second transfer medium; and combining the first cooled second transfer medium, the second cooled second transfer medium, and the third cooled second transfer medium to produce a single cooled second transfer medium.

5. The method according to any one of paragraphs 1 to 4, wherein the one or more refrigeration units comprise a single stage lithium bromide absorption refrigeration unit, a two stage lithium bromide absorption refrigeration unit, or a combination thereof.

6. The method according to any one of paragraphs 1 to 5, wherein the one or more cooled second transfer mediums have a temperature ranging from about 1° C. to about 20° C.

7. The method according to any one of paragraphs 1 to 6, wherein the cooled first oxidant has a temperature ranging from about 5° C. and about 35° C., and wherein the cooled second oxidant has a temperature ranging from about 5° C. and about 20° C.

8. The method according to any one of paragraphs 1 to 7, further comprising varying the temperature of the first cooled oxidant to match a demand of the gas turbine unit.

9. The method according to any one of paragraphs 1 to 8, wherein the first reformer comprises a steam methane reformer and the second reformer comprises an autothermal reformer.

10. The method according to any one of paragraphs 1 to 9, further comprising transferring heat from the exhaust gas to the compressed second oxidant to produce a heated compressed oxidant having a temperature ranging from about 450° C. to about 650° C. and a pressure ranging from about 1,500 kPa to about 8,000 kPa.

11. The method according to any one of paragraphs 1 to 10, wherein the exhaust gas exits the exhaust duct at a temperature of about 90° C. to about 150° C.

12. The method according to any one of paragraphs 1 to 11, wherein the hydrocarbon has a steam-to-carbon molar ratio ranging from about 2.7 to about 4.

13. The method according to any one of paragraphs 1 to 12, wherein the syngas product comprises about 10 mol % or less methane, about 40 mol % to about 60 mol % hydrogen, about 20 mol % to about 30 mol % nitrogen, about 5 mol % to about 15 mol % carbon monoxide, and about 10 mol % to about 20 mol % carbon dioxide, and the method further comprises converting at least a portion of the nitrogen and hydrogen in the syngas product to ammonia to produce an ammonia effluent.

14. A system for reforming a hydrocarbon, comprising: a first reformer configured to produce a first reformed hydrocarbon and an exhaust gas; one or more first heat exchangers at least partially disposed within an exhaust duct of the first reformer, wherein the exhaust gas transfers heat to one or more first transfer mediums flowing through the one or more first heat exchangers; one or more refrigeration units coupled to the one or more first heat exchangers and configured to receive the one or more heated first transfer mediums, wherein the one or more heated first transfer mediums power the one or more refrigeration units, and wherein the one or more refrigeration units are configured to cool one or more second transfer mediums; one or more second heat exchangers coupled to the one or more refrigeration units and configured to transfer heat from one or more oxidants to the one or more cooled second transfer mediums to produce a cooled first oxidant and a cooled second oxidant; one or more gas turbine units configured to receive the cooled first oxidant, wherein the one or more gas turbine units produce mechanical power and an expanded turbine exhaust gas; one or more compression units configured to receive the cooled second oxidant to produce a compressed second oxidant; and a second reformer configured to receive the compressed second oxidant and the first reformed hydrocarbon and produce a syngas product therefrom.

15. The system of paragraph 14, further comprising a third heat exchanger disposed within the exhaust duct of the first reformer, wherein the exhaust gas transfers heat to the compressed second oxidant via the third heat exchanger to produce a heated second oxidant.

16. The system according to any one of paragraphs 14 and 15, wherein the one or more refrigeration units comprise a single stage lithium bromide absorption refrigeration unit, a two stage lithium bromide absorption refrigeration unit, or a combination thereof.

17. The system according to any one of paragraphs 14 to 16, wherein the one or more refrigeration units comprise one two stage lithium bromide absorption refrigeration unit and two single stage lithium bromide absorption refrigeration units.

18. The system according to any one of paragraphs 14 to 17, wherein the one or more second heat exchangers comprise a third heat exchanger adapted to transfer heat from a first portion of the cooled second transfer medium to produce the cooled first oxidant and a fourth heat exchanger adapted to transfer heat from a second portion of the cooled second transfer medium to produce the cooled second oxidant.

19. The system according to any one of paragraphs 14 to 18, further comprising one or more ammonia synthesis systems configured to convert at least a portion of any hydrogen and nitrogen in the syngas product to ammonia.

20. The system of paragraphs 19, wherein the one or more gas turbine units are frame-5 gas turbine units, and wherein the one or more ammonia synthesis systems produce between about 2,200 tons per day to about 2,500 tons per day.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. When molar or volume percentage contents of a particular line or stream are described, it is assumed that the sum of all such percentages of all materials present in any particular line or stream is equal to 100% (molar or volume, as appropriate to the context).

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to certain embodiments of the present invention, other and further embodiments of the invention may be devised without departing from the basic scope thereof, and the scope thereof is determined by the claims that follow.

What is claimed is:

1. A method for reforming a hydrocarbon, comprising:
   combusting at least a portion of an expanded turbine exhaust gas and a first fuel within a first reformer to produce a first reformer exhaust gas;
   reforming a hydrocarbon in the first reformer in the presence of one or more first catalysts and steam at conditions sufficient to produce a first reformed hydrocarbon;
   heating one or more first transfer mediums by indirectly transferring heat from the first reformer exhaust gas to the one or more first transfer mediums;
   powering one or more refrigeration units with thermal energy from the one or more heated first transfer mediums;
   cooling one or more second transfer mediums within the one or more refrigeration units to produce one or more cooled second transfer mediums;
   transferring heat from one or more oxidants to the one or more cooled second transfer mediums to produce a cooled first oxidant and a cooled second oxidant;
   introducing the cooled first oxidant and a second fuel to a gas turbine unit to produce the expanded turbine exhaust gas and mechanical power;
   powering a compressor with the mechanical power;
   compressing the cooled second oxidant in the compressor to produce a compressed second oxidant; and
   introducing the compressed second oxidant and the first reformed hydrocarbon to a second reformer to produce a syngas product.

2. The method of claim 1, wherein the one or more first transfer mediums and the one or more second transfer mediums comprise water, steam, hot oil, or any combination thereof.

3. The method of claim 1, wherein the one or more heated first transfer mediums comprise at least three transfer mediums, wherein a first heated first transfer medium comprises steam at a pressure of about 375 kPa to about 1,100 kPa, a second heated first transfer medium comprises steam at a pressure of about 125 kPa to about 350 kPa, and a third heated first transfer medium comprises water at a temperature of about 80° C. to about 100° C.

4. The method of claim 3, further comprising:
   introducing the first heated first transfer medium to a two stage lithium bromide absorption refrigeration unit to produce a first cooled second transfer medium;
   introducing the second heated first transfer medium to a first single stage lithium bromide absorption refrigeration unit to produce a second cooled second transfer medium;
   introducing the third heated first transfer medium to a second single stage lithium bromide absorption refrigeration unit to produce a third cooled second transfer medium; and
   combining the first cooled second transfer medium, the second cooled second transfer medium, and the third cooled second transfer medium to produce a single cooled second transfer medium.

5. The method of claim 1, wherein the one or more refrigeration units comprise a single stage lithium bromide absorption refrigeration unit, a two stage lithium bromide absorption refrigeration unit, or a combination thereof.

6. The method of claim 1, wherein the one or more cooled second transfer mediums have a temperature ranging from about 1° C. to about 20° C.

7. The method of claim 1, wherein the cooled first oxidant has a temperature ranging from about 5° C. and about 35° C., and wherein the cooled second oxidant has a temperature ranging from about 5° C. and about 20° C.

8. The method of claim 7, further comprising varying the temperature of the first cooled oxidant to match a demand of the gas turbine unit.

9. The method of claim 1, wherein the first reformer comprises a steam methane reformer and the second reformer comprises an autothermal reformer.

10. The method of claim 1, further comprising transferring heat from the exhaust gas to the compressed second oxidant to produce a heated compressed oxidant having a temperature ranging from about 450° C. to about 650° C. and a pressure ranging from about 1,500 kPa to about 8,000 kPa.

11. The method of claim 1, wherein the exhaust gas exits the exhaust duct at a temperature of about 90° C. to about 150° C.

12. The method of claim 1, wherein the hydrocarbon has a steam-to-carbon molar ratio ranging from about 2.7 to about 4.

13. The method of claim 1, wherein the syngas product comprises about 10 mol % or less methane, about 40 mol % to about 60 mol % hydrogen, about 20 mol % to about 30 mol % nitrogen, about 5 mol % to about 15 mol % carbon monoxide, and about 10 mol % to about 20 mol % carbon dioxide, and the method further comprises converting at least a portion of the nitrogen and hydrogen in the syngas product to ammonia to produce an ammonia effluent.

14. A system for reforming a hydrocarbon, comprising:
a first reformer configured to produce a first reformed hydrocarbon and an exhaust gas;
one or more first heat exchangers at least partially disposed within an exhaust duct of the first reformer, wherein the exhaust gas transfers heat to one or more first transfer mediums flowing through the one or more first heat exchangers;
one or more refrigeration units coupled to the one or more first heat exchangers and configured to receive the one or more heated first transfer mediums, wherein the one or more heated first transfer mediums power the one or more refrigeration units, and wherein the one or more refrigeration units are configured to cool one or more second transfer mediums;
one or more second heat exchangers coupled to the one or more refrigeration units and configured to transfer heat from one or more oxidants to the one or more cooled second transfer mediums to produce a cooled first oxidant and a cooled second oxidant;
one or more gas turbine units configured to receive the cooled first oxidant, wherein the one or more gas turbine units produce mechanical power and an expanded turbine exhaust gas;
one or more compression units configured to receive the cooled second oxidant to produce a compressed second oxidant; and
a second reformer configured to receive the compressed second oxidant and the first reformed hydrocarbon and produce a syngas product therefrom.

15. The system of claim 14, further comprising a third heat exchanger disposed within the exhaust duct of the first reformer, wherein the exhaust gas transfers heat to the compressed second oxidant via the third heat exchanger to produce a heated second oxidant.

16. The system of claim 14, wherein the one or more refrigeration units comprise a single stage lithium bromide absorption refrigeration unit, a two stage lithium bromide absorption refrigeration unit, or a combination thereof.

17. The system of claim 14, wherein the one or more refrigeration units, comprise one two stage lithium bromide absorption refrigeration unit and two single stage lithium bromide absorption refrigeration units.

18. The system of claim 14, wherein the one or more second heat exchangers comprise a third heat exchanger adapted to transfer heat from a first portion of the cooled second transfer medium to produce the cooled first oxidant and a fourth heat exchanger adapted to transfer heat from a second portion of the cooled second transfer medium to produce the cooled second oxidant.

19. The system of claim 14, further comprising one or more ammonia synthesis systems configured to convert at least a portion of any hydrogen and nitrogen in the syngas product to ammonia.

20. The system of claim 19, wherein the one or more gas turbine units are frame-5 gas turbine units, and wherein the one or more ammonia synthesis systems produce between about 2,200 tons per day to about 2,500 tons per day.

\* \* \* \* \*